United States Patent [19]
Yamaguchi et al.

[11] Patent Number: 5,741,072
[45] Date of Patent: Apr. 21, 1998

[54] TEMPERATURE SENSOR ELEMENT FOR A TEMPERATURE-MEASURING DEVICE

[75] Inventors: Ishine Yamaguchi, Akashi; Toshiyuki Kitaura, Kishiwada; Hidekazu Ikemoto, Shiga-ken, all of Japan

[73] Assignee: Kawaso Electric Industrial Co., Ltd., Osaka, Japan

[21] Appl. No.: 528,219

[22] Filed: Sep. 13, 1995

[30] Foreign Application Priority Data

Sep. 13, 1994 [JP] Japan .................. 6-244696

[51] Int. Cl.$^6$ .................. G01K 7/06; G01K 1/14; H01L 35/02
[52] U.S. Cl. .................. 374/179; 374/208; 439/913; 136/232; 136/233; 136/235
[58] Field of Search .................. 374/179, 208; 438/913, 934, 934.1, 936, 948; 136/232, 233, 235

[56] References Cited

U.S. PATENT DOCUMENTS

| | | | |
|---|---|---|---|
| 3,246,520 | 4/1966 | Gaskill et al. | 136/235 |
| 3,298,874 | 1/1967 | Davies | 136/232 |
| 3,427,208 | 2/1969 | Lowdermilk | 136/235 |
| 3,531,331 | 9/1970 | Davies | 136/235 |
| 3,643,509 | 2/1972 | Surinx | 374/179 |
| 3,664,882 | 5/1972 | Hance | 136/235 |
| 4,125,738 | 11/1978 | Nichols | 374/179 |
| 4,217,463 | 8/1980 | Swearingen | 374/179 |
| 4,401,389 | 8/1983 | Theuwis | 374/140 |
| 4,778,281 | 10/1988 | Falk | 374/179 |

FOREIGN PATENT DOCUMENTS

| | | |
|---|---|---|
| 2382683 | 3/1977 | France . |
| 902993 | 11/1985 | France . |
| 2528187 | 1/1976 | Germany .................. 136/232 |
| 0482480 | 3/1938 | United Kingdom .................. 136/232 |
| 0942617 | 11/1963 | United Kingdom .................. 136/235 |
| 1025027 | 4/1966 | United Kingdom .................. 136/235 |
| 1098520 | 1/1968 | United Kingdom . |

*Primary Examiner*—Diego F. F. Gutierrez
*Attorney, Agent, or Firm*—Sixbey, Friedman, Leedom & Ferguson; David S. Safran

[57] ABSTRACT

A temperature sensor element in a temperature-measuring device using a thermocouple having excellent insulation property and having a simple assembly procedure is provided. The temperature sensor element comprises a temperature-measuring means consisting of a heat-resistant protective tube having a thermocouple inserted therethrough, compensating conduction means having connecting sections which connect a pair of extension sections of a thermocouple element extending from the protective tube respectively, and support means to join and hold mutually the temperature-measuring means and the compensating conduction means. The end of the protective tube and the compensating conduction means are held under the condition that they face the support means and that the extension sections of the thermocouple element and the connecting sections of the compensating conduction means are inserted into holding chamber means provided in the support means. Then the holding chamber means is filled with a filler which is hardened to bury and fix the end of the protective tube, the extension sections of the thermocouple, and the connecting sections of the compensating conduction means in the filler.

11 Claims, 8 Drawing Sheets

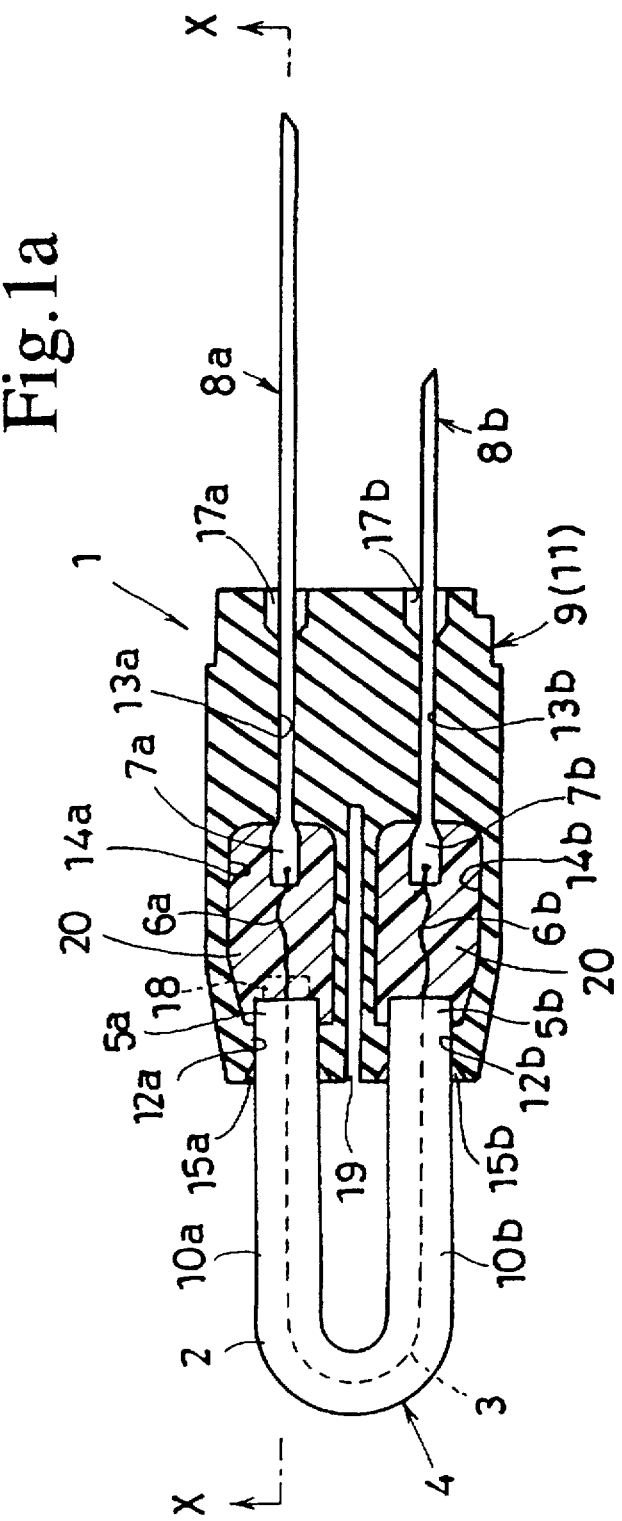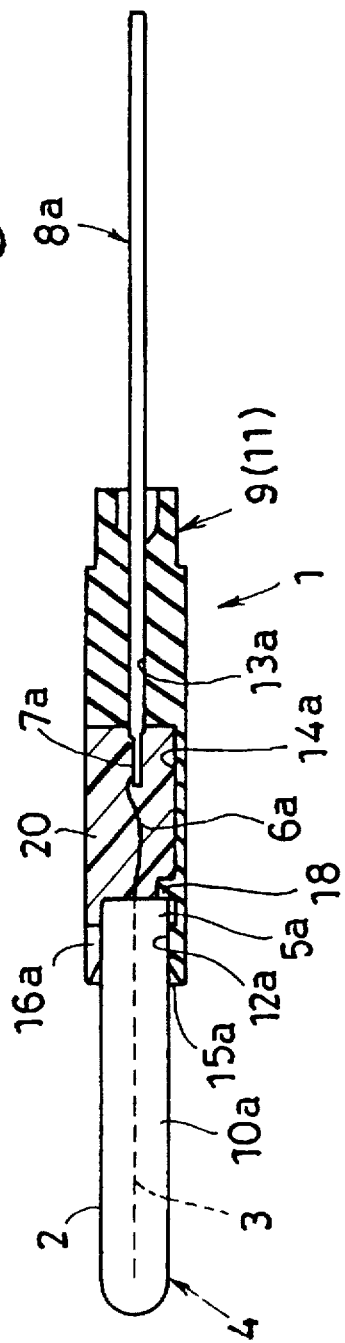

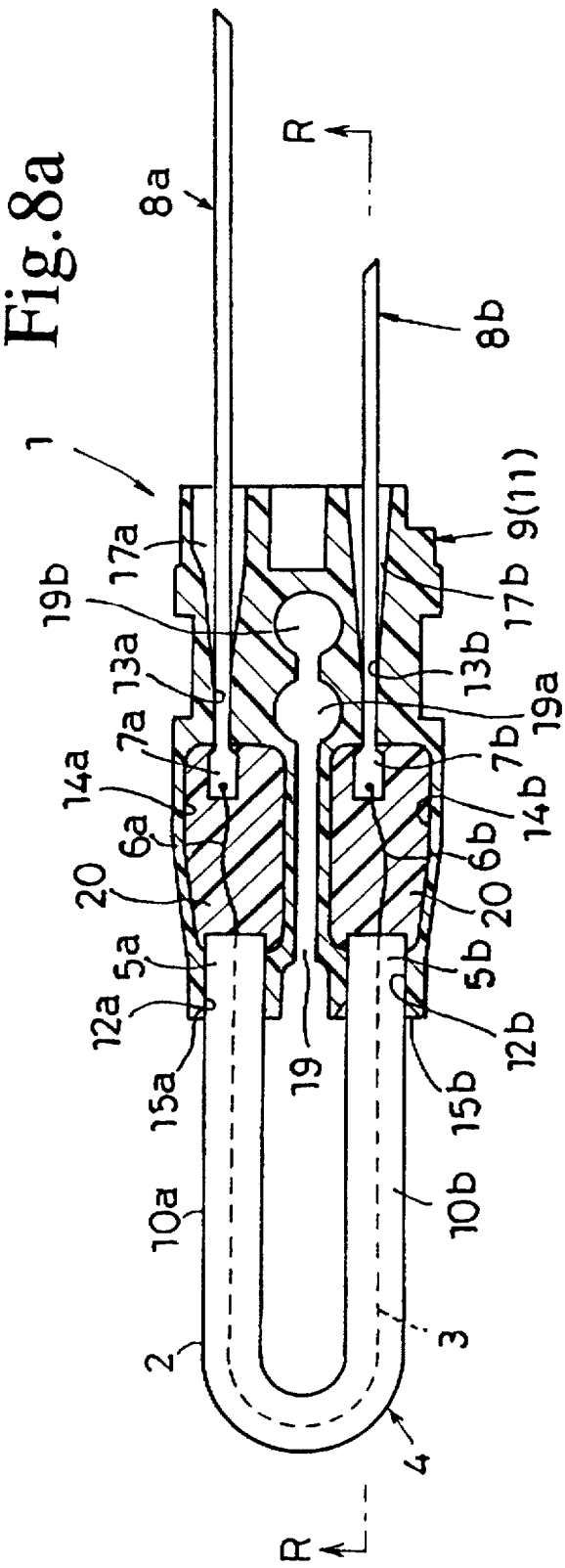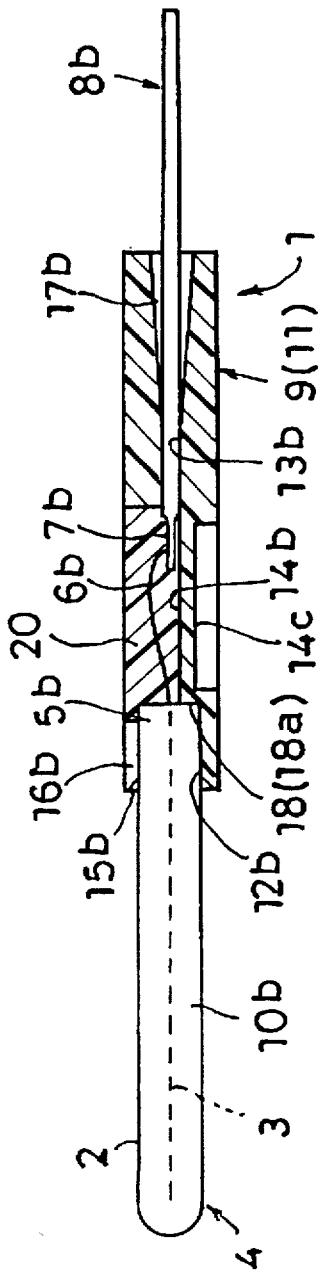

5,741,072

TEMPERATURE SENSOR ELEMENT FOR A TEMPERATURE-MEASURING DEVICE

FIELD OF THE INVENTION

The present invention relates to a temperature sensor element in a temperature-measuring device using a thermocouple.

BACKGROUND OF THE INVENTION

A temperature sensor means in a temperature-measuring device using a thermocouple conventionally consists of temperature-measuring means which comprises a thermocouple in a heat-resistant protective tube and a pair of compensating conduction means which have joint sections to which are connected a pair of extended sections of the element of the thermocouple extending from the ends of the protective tube. The compensating conduction means usually consist of support pins that form the connection terminals of an electric connector.

In order for the temperature sensor means to function in a temperature-measuring device, the protective tube and the compensating conduction means need to be fixed relative to each other. This reason for this is that if they were freely movable relative to each other, the extended sections of the element of the thermocouple would easily break.

In addition, the pair of extended sections of the element of the thermocouple need to be fixed apart from each other. The reason for this is that if the pair of thin extended sections of the element were free to move, they would be likely to bend and touch each other and cause a short-circuit.

To avoid these problems, for example, in conventional temperature-measuring devices, the temperature sensor means is disposed in a cup-shaped housing made of a molded refractory material such as a ceramic, and a refractory cement is packed into the housing. That is, compensating conduction means consisting of support pins are inserted into and held in insertion holes in the bottom of the housing, and with the extended sections of the element of the thermocouple inside the housing connected to the joint sections, the refractory cement is poured through the opening of the housing and allowed to solidify. The ends of the protective tube are thereby buried in the refractory cement. As a result, the protective tube and the compensating conduction means are fixed by the refractory cement and are integrated with the housing. The extended sections of the element of the thermocouple which extend from the protective tube are buried and fixed in the refractory cement together with the joint sections of the compensating conduction means to which the extended sections are connected.

Since the conventionally used refractory cement uses water or a solvent consisting mainly of water, the water needs to be removed from the refractory cement by forced drying to secure the insulation of the extended sections of the element of the thermocouple and of the joint sections of the compensating conduction means. The water removal makes the manufacturing process troublesome.

The inventors of the present invention have found that even if the water in the conventional refractory cement is completely removed by drying, the cement again absorbs moisture from the air after or during transportation and storage of the product. As a result, the insulation between the pins of the compensating conduction means degrades and the electromotive force is unstable and the accuracy of the temperature measurement obtainable is limited.

Since in the conventional technology described above, the ends of the protective tube are embedded in a cup-shaped housing while the refractory cement is poured thereinto, the positioning of the protective tube becomes difficult and also the protective tube must be firmly held using a jig until the refractory cement solidifies.

This problem may be solved by, for example, placing a positioning member for positioning the protective tube in the housing and pouring the refractory cement into the housing while the ends of the protective tube are held by the positioning member. In this case, however, the flow of refractory cement is obstructed by the positioning member, and it is difficult to fully fill every corner of the housing. Also, for example, when the positioning member is made of a non-flexible hard plastic material or the like, it is difficult to insert the protective tube into the positioning member because the protective tube is commonly a quartz tube having slight dispersion or aberration in shape and dimensions resulting from tolerances allowed in its manufacture.

SUMMARY OF THE INVENTION

An object of the present invention is to provide a temperature sensor element in a temperature-measuring device using a thermocouple, which element has superior insulation and is simple and easy in assembly.

According to a first aspect of the present invention, there is provided a temperature sensor element comprising: temperature-measuring means including a heat-resistant protective tube having a thermocouple inserted therein; compensating conduction means having connecting sections which connect a pair of extension sections of said thermocouple extending from the protective tube; and support means to join and hold both said temperature-measuring means and said compensating conduction means; wherein said support means is formed with a block body having support hole means at an end thereof through which said protective tube is inserted, insertion hole means at the other end thereof through which said compensating conduction means are inserted, and holding chamber means formed therein which communicates the support hole means and the insertion hole means with each other, said holding chamber means being formed in a concave shape with a bottom face formed by depressing a side of the block body, and having stopper means in the holding chamber means in the vicinity of the support hole means, and the end of the protective tube which is inserted into the support hole means projects into the holding chamber means and abuts said stopper means, said connecting sections of the compensating conduction means which are respectively inserted into the insertion hole means project into said holding chamber means, and a filler is introduced into and hardened in said holding chamber means under a condition that the extension sections of the thermocouple are respectively connected with the connecting sections within the holding chamber means to bury and fix the end of the protective tube, the extension sections of the thermocouple, and the connecting sections of the compensating conduction means in said filler.

Since the present invention does not use refractory cement which has conventionally been used, no forced drying step of the kind described above for removing water content is required. The elimination of the drying step makes the manufacturing process simple and inexpensive. In addition, since the block body constituting the support means is formed of a material substantially non-hygroscopic and water-free and the filler with which the holding chamber is filled also is non-hygroscopic and water-free, the invention provides a temperature sensor element having excellent insulation and giving stable electromotive force with high temperature-measuring accuracy.

Also, the present invention has support means which supports both the heat-resistant protective tube with the thermocouple therein and the compensating conduction means. The support means consists of the block body which receives and holds the end of the protective tube through the support hole at one end thereof and receives and holds the compensating conduction means in the insertion hole at the other end thereof, whereby the protective tube and the compensating conduction means can be pre-assembled together when the device is being assembled. Since the holding chamber is provided with stopper means, the positioning of the protective tube is particularly easy during the insertion thereof into the support hole because the end of the protective tube stops by abutting with the stopper means. The block body has the holding chamber which receives the end of the protective tube and the joint sections of the compensating conduction means with both projecting into the holding chamber, and the temperature sensor element is constituted by filling the filler into the holding chamber and hardening it. As a result, the protective tube and the compensating conduction means are firmly fixed in their relative positions by the hardened filler. The extended sections of the element of the thermocouple and the joint sections of the compensating conduction means connected to the extended sections are buried and fixed in the hardened filler and protected. Since the block body and the filler are made of a material substantially non-hygroscopic and water-free, the invention provides a temperature sensor element having excellent insulation.

Since the holding chamber is a bottomed concavity formed by recessing a side of the block body, filling the chamber with the filler is facilitated. That is, the filler is charged through the opening of the concavity toward the bottom thereof, and the filler is then hardened.

According to a second aspect of the present invention, the compensating conduction means consist of support pins which constitute the connector terminals of an electrical connector.

As described above, according to the present invention, the support means which supports the protective tube and the compensating conduction means is flexible and can be deformed and return to its original shape freely. However, as a whole the temperature sensor element has sufficient rigidity because the filler which is filled into the holding chamber and hardened, buries and integrates both the extended sections of the element of the thermocouple extended from the protective tube and the joint sections of the compensating conduction means connected to the extended sections and provides this buried and integrated part with rigidity. Consequently, even when the compensating conduction means consist of support pins constituting connecting terminals of the socket side of an electrical connector, or when the support pins are subjected to an external force on insertion of the plug side of the electrical connector, there is no breaking of the element of the thermocouple.

According to a third aspect of the present invention, the block body which constitutes the support means is made of a deformable and recoverable material such as rubber or flexible plastics.

Consequently, easy insertion and holding of the end of the protective tube in the support hole in the support means becomes possible. That is, the flexible support hole can smoothly receive and hold the end even when the protective tube has dispersion or aberration in shape and dimensions arising from the tolerances used in its manufacture.

According to a fourth aspect of the present invention, the support means consisting of the block body forms a first holding chamber and a second holding chamber which respectively receive the pair of extended sections of the thermocouple element and respectively receive a joint section of a first compensating conduction means and a joint section of a second compensating conduction means, each having one of the extended sections of the thermocouple element connected thereto, and filler is filled into each of the holding chambers and hardened. Since the pair of extended sections of the element of the thermocouple are held individually in the first holding chamber and the second holding chamber and are separately fixed there by the hardened filler, there is no possibility of short-circuiting caused by the filling pressure of the filler forcing the pair of extended sections of the element of the thermocouple to bend and make contact with each other.

According to the present invention, therefore, it is possible to assemble a U-shaped temperature-measuring means which has a substantially U-shaped heat-resistant protective tube having a pair of leg sections. If a slit is formed in the block body starting from an end of the block body and extending between the first holding chamber and the second holding chamber, the insertion of the pair of leg sections of the U-shaped protective tube into a pair of support holes in the block body becomes easy. In other words, both leg sections of the U-shaped protective tube can easily be inserted into the pair of support holes because the block body can be elastically deformed owing to the slit even when the U-shaped protective tube had dispersion or aberration in the gap dimension between the legs within tolerances allowed in its manufacture or when there is twist between the pair of leg sections.

According to a fifth aspect of the present invention, a cylinder section which forms the support hole or the support holes through which the end or the ends of the protective tube pass has a groove or grooves along the axial direction of the support hole to divide the peripheral wall of the cylinder section.

This configuration makes the work of inserting the end of the protective tube into the support hole easy, and allows the end of the inserted protective tube to be elastically supported by the cylinder section.

According to a sixth aspect of the present invention, a temperature sensor element comprises: temperature-measuring means including a heat-resistant protective tube formed in substantially U-shaped with a pair of leg sections and having a thermocouple inserted therethrough; first compensating conduction means and second compensating conduction means having connecting sections connecting a pair of extension sections of a thermocouple element extending from the leg sections; and support means which connects and supports the temperature-measuring means and the pair of compensating conduction means; wherein, said support means is formed with a block body having a first support hole and a second support hole for respectively inserting the pair of leg sections of the protective tube in one end thereof, a first insertion hole and a second insertion hole for respectively inserting the pair of compensating conduction means in another end thereof, and first holding chamber and second holding chamber formed therein to mutually communicate the first support hole and the first insertion hole, and to mutually connect the second support hole and the second insertion hole respectively, said block body being formed by a deformable and recoverable material such as rubber or flexible plastics, and being provided with a slit starting from one end of the block body and extending between the first holding chamber and the second holding chamber. The first leg section of the protective tube inserted into the firs support hole projects into the first holding chamber, and the connecting section of the first compensating conduction means inserted into the first insertion hole projects into the first holding chamber, and a filler is introduced into and hardened in the first holding chamber under a condition that the first extension section of the thermocouple element is connected with the connecting section within the first holding chambers to bury and fix the leg section of the protective tube, the first extension section of the thermocouple element, and the connecting section of the first compensating conduction means in the filler. And the second leg section of the protective tube inserted into the second support hole projects into the second holding chamber, and the connecting section of the second compensating conduction means inserted into the second insertion hole projects into the second holding chamber, and the filler is introduced into and hardened in the second holding chamber under a condition that the second extension section of the thermocouple element is connected with the connecting section within the second holding chamber to bury and fix the leg section of the protective tube, the second extension section of the thermocouple element, and the connecting section of the second compensating conduction means in the filler.

BRIEF DESCRIPTION OF THE DRAWINGS

FIG. 1(a) and FIG. 1(b) show a first embodiment of the temperature sensor element of the present invention, FIG. 1(a) being a longitudinal cross sectional view and FIG. 1(b) being a cross sectional view along X—X line in FIG. 1(a).

FIG. 8(a) and FIG. 8(b) are cross sectional views of a temperature sensor element of a fourth embodiment of the present invention, FIG. 8(a) being a longitudinal cross sectional view and FIG. 8(b) being a cross sectional view along R—R line in FIG. 8(a).

DETAILED DESCRIPTION OF THE PREFERRED EMBODIMENTS

The preferred embodiments of the present invention are described in detail below, with reference to the drawings.

First Embodiment

Figure 2:
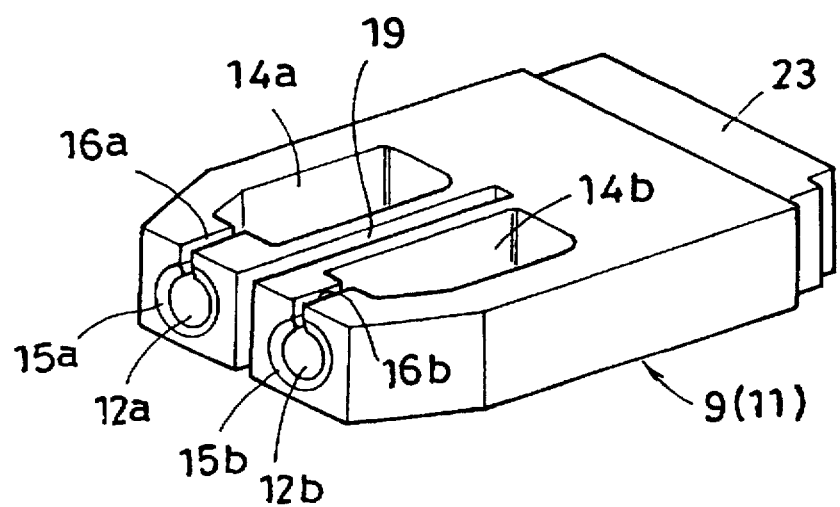
FIG. 2 is a perspective view of a support means which forms the first embodiment of this invention.

FIG. 1(a), FIG. 1(b) and FIG. 2 illustrate a first embodiment of the present invention. A temperature sensor element (1) comprises a temperature-measuring means (4) which has a thermocouple (3) disposed within a heat resistant protective tube (2) made of quartz or the like, compensating conduction means (8) which has a connecting section (7) connecting an extension section (6) of a thermocouple element extending from an end (5) of the protective tube (2), and support means (9) which connects and supports the temperature-measuring means (4) and the compensating conduction means (8) together.

In the first embodiment, the protective tube (2) which constitutes the temperature-measuring means (4) is formed to be substantially U-shaped, having a pair of leg sections (10a) and (10b), and a pair of extension sections (6a) and (6b) of the thermocouple element extend from the ends (5a) and (5b) of these leg sections. According to this configuration, the compensating conduction means (8) consists of first compensating conduction means (Sa) and second compensating conduction means (8b). Each of connecting sections (7a) and (7b) respectively connects the extension sections (6a) and (6b) of the thermocouple element. The compensating conduction means (8a) and (8b) may be formed by a compensating lead wire, but it may be preferable to form support pins as the connection terminals of the electric connector as shown in the drawings.

The support means (9) comprises a relatively flat block body (11) formed from a material which is substantially non-hygroscopic and non-hydrous as well as deformable and recoverable, for example an elastic material such as rubber etc. or a flexible material such as flexible plastics etc. The block body (11) has first support holes (12a) and (12b) which respectively receive a pair of leg sections (10a) and (10b) at one end of the block body (11), first and second insertion holes (13a) and (13b) which respectively receive the pair of compensating conduction means (8a) and (8b) at the other end thereof, a first holding chamber (14a) which communicates the first support hole (12a) and the first insertion hole (13a) with each other, and a second holding chamber (14b) which communicates the second support hole (12b) and the second insertion hole (13b) with each other.

The first support hole (12a) and the second support hole (12b) have taper sections (15a) and (15b) opening onto one end of the block body (11) whose diameters increase as they approach the end face of the block body (11). In addition, as shown in FIG. 2, grooves (16a) and (16b) which respectively divide the peripheral walls of the support holes (12a) and (12b) are formed from the holding chambers (14a) and (14b) to the end of the block body (11) along the axis of the support holes (12a) and (12b).

The first insertion hole (13a) and the second insertion hole (13b) respectively form enlarged hole sections (17a) and (17b) which open at the other end of the block body (11).

The first holding chamber (14a) and the second holding chamber (14b) are formed in concave shapes having bottoms by depressing a side of the block body (11), and have a stopper (18) which projects from at least one bottom section of the holding chambers (14a) and (14b).

The block body (11) has a slit (19) formed therein which extends from one end of the block body (11) between the first holding chamber (14a) and the second holding chamber (14b).

On the basis of the structure described above, the temperature sensor element (1) is assembled according to the procedure described below.

The first compensating conduction means (8a) and the second compensating conduction means (8b) are respectively inserted through the first insertion hole (13a) and the second insertion hole (13b), and the connecting sections (7a)

and (7b) are inserted into the holding chambers (14a) and (14b). Since the block body (11) is formed of a deformable and recoverable material such as rubber or flexible plastics, and the compensating conduction means (8a) and (8b) consist of support pins as shown in FIG. 1, it assures that the support pins are retained in the insertion holes (13a) and (13b).

The substantially U-shaped protective tube (2) which forms the temperature-measuring means (4) allows insertion of a pair of leg sections (10a) and (10b) respectively into the first support hole (12a) and the second support hole (12b). During insertion, the leg sections (10a) and (10b) are easily inserted into the support holes (12a) and (12b) using the taper sections (15a) and (15b) as guides. Since the support holes (12a) and (12b) is easily enlarged or deformed due to the grooves (16a) and (16b), the insertion of the leg sections into the support holes (12a) and (12b) is carried out easily even when there are variations in the outer dimensions of the protective tube (2) within a given tolerance of the manufacturing process. In addition, since the gap between and position of the pair of support holes (12a) and (12b) is adjustable by deforming the block body (11) by means of the slit (19), the leg sections (10a) and (10b) can be readily inserted into the support holes (12a) and (12b), even when the protective tube has a variation in the gap between the leg sections (10a) and (10b) within a tolerance in the manufacturing process or when there is a slight torsion between the pair of leg sections (10a) and (10b). After insertion, when the end (5a) of one leg section (10a) touches the positioning stopper (18), the insertion point of the U-shaped protective tube (2) is determined. In this positioned state, the ends (5a) and (5b) of the leg sections (10a) and (10b) project into the first holding chamber (14a) and the second holding chamber (14b), and the leg sections (10a) and (10b) are held in the support holes (12a) and (12b).

The extension sections (6a) and (6b) of the thermocouple element are introduced into the holding chambers (14a) and (14b), where they are respectively connected to the connecting sections (7a) and (7b).

In the state where the protective tube (2) and the compensating conduction means (8a) and (8b) are pre-assembled by way of the support means (9), a substantially non-hygroscopic and non-hydrous filler (20) is introduced into the holding chambers (14a) and (14b) and hardened. The filler (20) may be a thermosetting resin. When the filler (20) is hardened, the ends (5a) and (5b) of the protective tube (2), the extension sections (6a) and (6b) of the thermocouple element, and the connecting sections (7a) and (7b) are covered by and integrated with the hardened filler (20). This covered and integrated section forms a rigid body. That is, within the first holding chamber (14a), the end (5a), the extension section (6a) and the connecting section (7a) are integrated rigidly together by the filler (20). Within the second holding chamber (14b), the end (5b), the extension section (6b) and the connecting section (7b) are integrated rigidly together by the filler (20). Accordingly, the support means (9) itself remains flexible, however, even after completing assembly by hardening the filler (20), the protective tube (2) and the compensating conduction means (8a) and (8b) are firmly fixed together and the extension sections (6a) and (6b) of the thermocouple element are insulatively buried in the filler (2) while being connected to the connecting sections (7a) and (7b).

The temperature sensor element (1) of the first embodiment of the present invention can be used by attaching it to a target material. For example, where measuring the wall temperature inside a furnace, a plurality of temperature sensor elements (1) are attached at suitable positions on the furnace wall surface. Where measuring pipe temperature in a gas pipeline, a plurality of temperature sensor elements (1) are attached at suitable positions on the pipe wall surface. The compensating conduction means (8a) and (8b) are connected to the terminals of an electric cable extending from an electromotive force monitoring means.

Alternatively, the temperature sensor element (1) of the first embodiment of the present invention may be formed with the suitable coating layer, though this is not shown in the figure. For example, a temperature sensor element (1) may be formed by shell molding, or the temperature sensor element (1) may be covered by a material with plasticity such as clayey paper consisting mainly of a water-resistant paper. In such cases, the protective tube (2) is exposed at one end of the molded shell mold and the coating material consisting of paper and the compensating conduction means (8a) and (8b) are exposed at the other end thereof.

Second Embodiment

Figure 3:
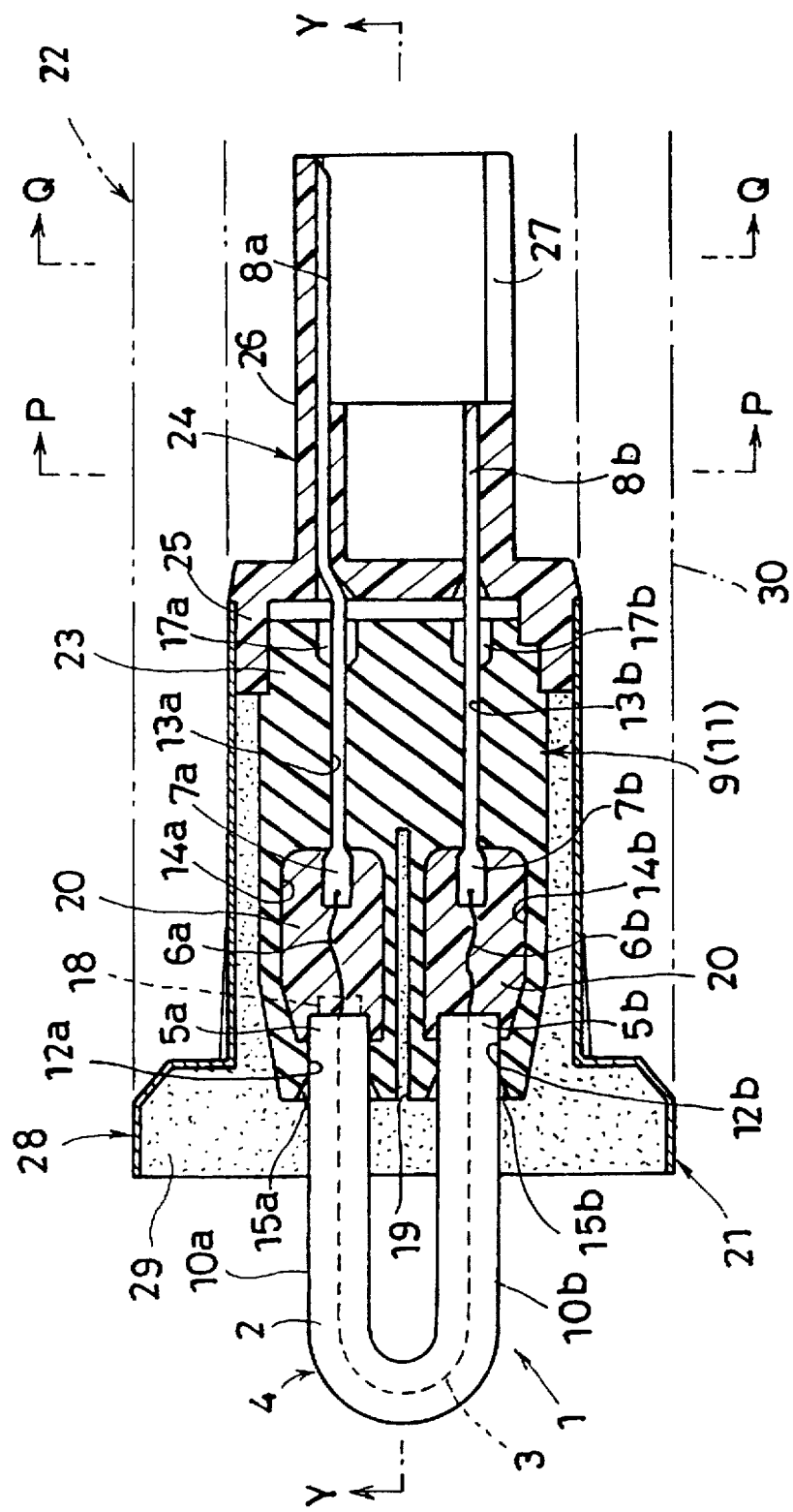
FIG. 3 is a longitudinal cross sectional view of a temperature-measuring cartridge of a second embodiment using the temperature sensor element of the present invention.
Figure 4:
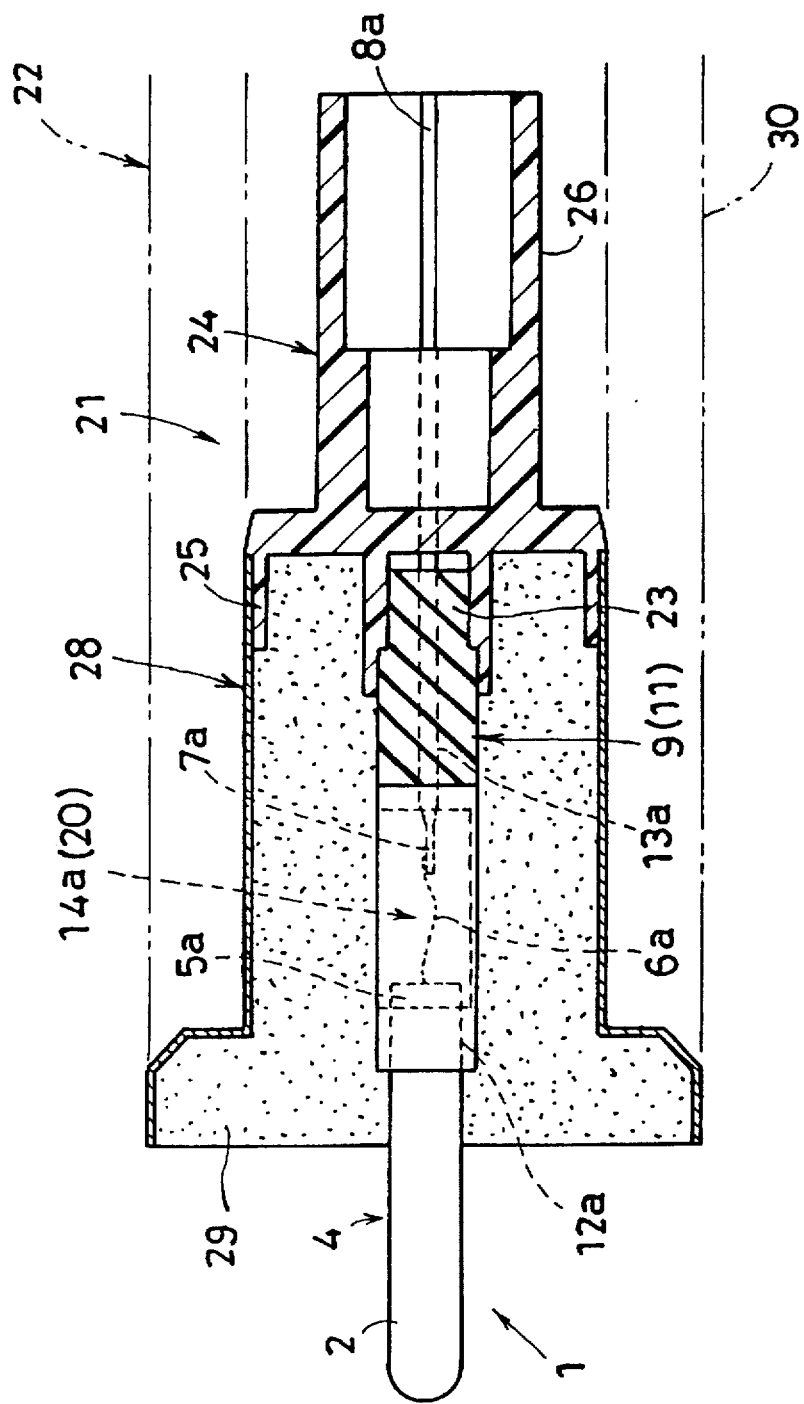
FIG. 4 is a cross sectional side view of the second embodiment of the present invention taken along Y—Y line in FIG. 3.
Figure 5A:
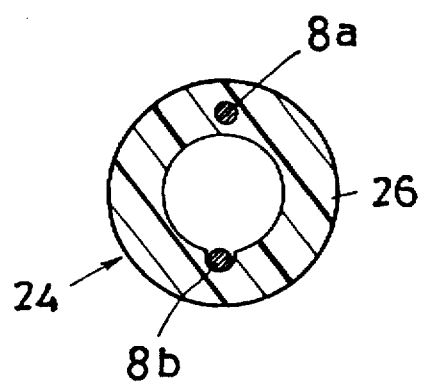
FIG. 5(a) and FIG. 5(b) are cross sectional views of a connector socket which forms the second embodiment of the present invention, FIG. 5(a) being a cross sectional view along the P—P line in FIG. 3 and FIG. 5(b) being a cross sectional view along the Q—Q line in FIG. 3.
Figure 5B:
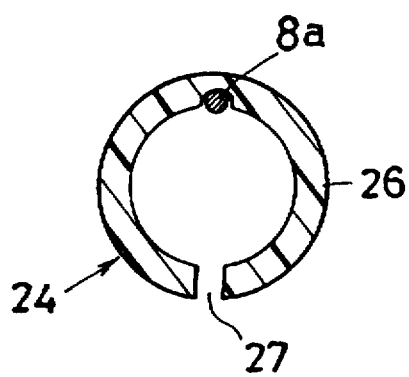

FIG. 3 through FIG. 5 show a second embodiment of the present invention, which comprises a temperature-measuring cartridge (21) containing the temperature sensor element (1), the cartridge (21) being disposed in a temperature-measuring probe (22) for molten metal.

The structure of this temperature sensor element (1) is similar to that of the first embodiment, and the same reference numbers as those in the first embodiment have been used.

A plug section (23) is formed at the end of the support means (9) on the temperature sensor element (1), this plug section (23) being inserted into a flange section (25) of a connector socket (24). A cylinder section (26) of the connector socket (24) is permitted to be deformably extended and/or retracted owing to the split groove (27). The compensating conduction means (8a) and (8b) are disposed along the inner face of the cylinder section (26).

The flange section (25) of the connector socket (24) is inserted into a cylindrical housing (28) formed by a thin metallic sheet, the housing (28) enclosing the support means (9) and extending to a middle portion of the temperature-measuring means (4). The housing (28) is filled with refractory cement (29) and a portion of the temperature-measuring means (4) and the support means (9) are buried therein.

The temperature-measuring cartridge (21) comprises the temperature sensor element (1), the connector socket (24), and the housing (28), and is built in a casing (30) such as a paper tube which consists the body of the probe (22). The temperature-measuring means (4) projects from the end of the probe (22).

The probe (22) is used by immersing it into a molten metal via a lift device to measure the temperature thereof.

Third Embodiment

Figure 6:
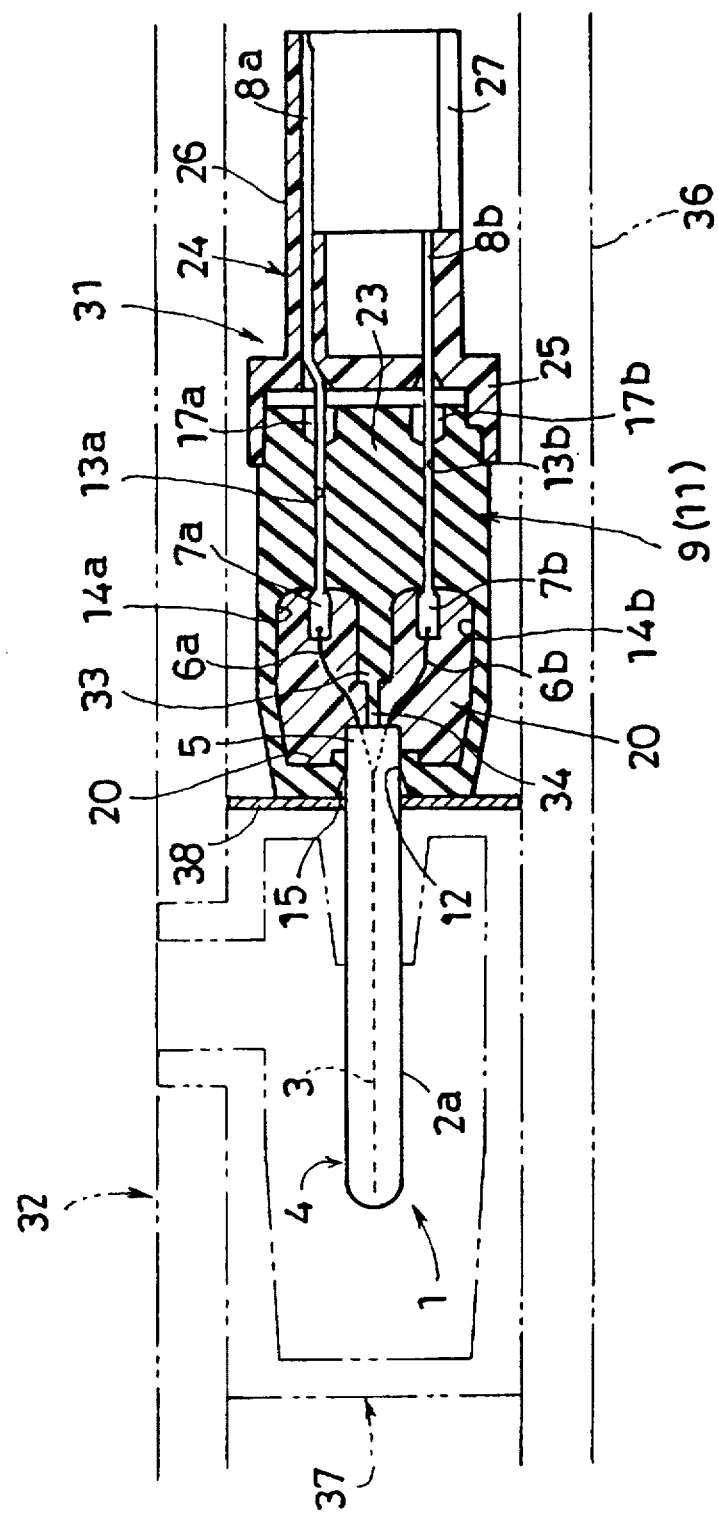
FIG. 6 is a longitudinal cross sectional view of a third embodiment of the present invention which constitutes a cartridge for measuring the solidifying temperature of a molten metal and uses the temperature sensor element of the present invention.
Figure 7:
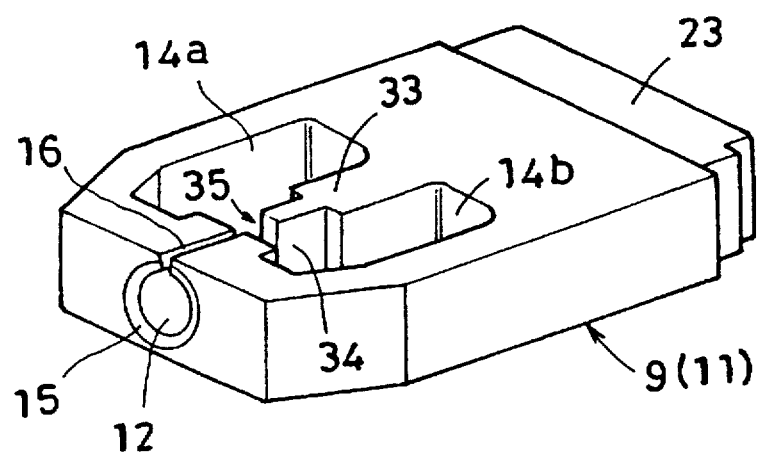
FIG. 7 is a perspective view of the support means which constitutes the third embodiment of the present invention.

FIG. 6 and FIG. 7 show a third embodiment of the present invention, which comprises a cartridge (31) for measuring the solidification temperature of molten metal. The cartridge (31) contains the temperature sensor element (1), and is disposed in a probe (32) for sampling molten metal.

The structure of the temperature sensor element (1) is basically the same as the structure of the first embodiment. Common components are given the same reference numbers as in the first embodiment. Nevertheless, there are parts which are different from the corresponding parts in the first embodiment, these different parts being described in the following.

The protective tube (2a) forming the temperature-measuring means (4) is made of quartz or the like, and is a straight tube with one end closed. The extensions sections (6a) and (6b) of the thermocouple element which is located in the protective tube (2a) extend from the open end (5) of the protective tube (2a). Accordingly, at one end of the block body (11) which forms the support means (9), a support hole (12) is provided to receive the end section of the protective tube (2a), and a groove (16) is formed to divide the peripheral wall of the hole (12) to facilitate engagement and deformation of the support hole (12). The pair of holding chambers (14a) and (14b) which receive the pair of extended sections (6a) and (6b) and the connection sections (7a) and (7b) of the compensating conduction means (8a) and (8b) are substantially sectioned by a separation wall (33). Adding to this separation, a stopper wall (34) is formed at the tip of the separation wall (33), and a passage (35) is formed at the tip of the stopper wall (34) facing the support hole (12) and communicates the pair of holding chambers (14a) and (14b) with each other. Consequently, when the protective tube (2a) is inserted through the support hole (12), the end (5) touches the front edge of the stopper wall (34) to ensure positioning thereof. In this state, the end (5) of the protective tube (2a) projects into the passage (35) between the pair of holding chambers (14a) and (14b), and the pair of extension sections (6a) and (6b) are introduced separately into the holding chambers (14a) and (14b) to connect with the connecting sections (7a) and (7b).

The filler (20) is introduced into the holding chambers (14a) and (14b) including the passage (35), and is hardened therein. As a result, the hardened filler (20) integrally fixes the end (5) of the protective tube (2a) and the compensating conduction means (8a) and (8b). The extension sections (6a) and (6b) of the thermocouple element and the connecting sections (7a) and (7b) are covered by and buried in the filler (20) and thereby insulated.

By combining the temperature sensor element (1) and the connector socket (24), the cartridge (31) for measuring the solidification temperature of a molten metal is constructed. The structure of the connector socket (24) is the same as that described in the second embodiment, and corresponding reference numbers are the same as in the second embodiment.

The cartridge (31) for measuring the solidification temperature of a molten metal is built in a casing (36) formed by, for example, a paper tube which forms the body of the probe (32), and the temperature-measuring means (4) projects into a sampling vessel (37) for molten metal. A thermal insulation wall (38) made of, for example a ceramic plate, is installed between the support means (9) of the temperature sensor element (1) and the sampling vessel (37).

The probe (32) is used by immersing it into a molten metal using a lift device to sample the molten metal in the sampling vessel (37). The sampled molten metal solidifies in the sampling vessel (37), and the solidification temperature is determined at the point of solidification.

Fourth Embodiment

FIG. 8(a) and FIG. 8(b) show a fourth embodiment of the present invention. The structure of the temperature sensor element (1) of this fourth embodiment is basically the same as in the first embodiment, and the reference numbers therefor are the same as in FIG. 1.

The block body (11) which forms the support means (9) has a concave shape with a bottom face formed by depressing a side of the block body to form the first holding chamber (14a) and the second holding chamber (14b), which configuration is the same with that in the first embodiment. However, as shown in FIG. 8(b), bottom sections (14c) and (14c) in the holding chambers (14a) and (14b) are formed in a raised bottom shape which is raised from the other side of the block body (11). As a result, both holding chambers (14a) and (14b) have a shallow concave shape.

Furthermore, the bottom sections (14c) and (14c) of raised bottom shape have steps (18a) and (18a) opposing respectively to the openings of the support holes (12a) and (12b) facing the holding chambers (14a) and (14b). The steps (18a) and (18a) form the stopper means (18) and (18).

At the assembling stage of the temperature sensor element (1), when a pair of leg sections (10a) and (10b) of the U-shaped protective tube (2) are inserted through the first support hole (12a) and the second support hole (12b), the ends (5a) and (5b) of the leg sections (10a) and (10b) respectively abut the stopper means (18) and (18) to position the insertion point of the U-shaped protective tube (2). Since the holding chambers (14a) and (14b) are formed in a shallow concave shape by the raised bottoms (14c) and (14c), the quantity of filler (20) to be introduced into the holding chambers is relatively small.

The slit (19) which starts from one end of the block body (11) and extends between the first holding chamber (14a) and the second holding chamber (14b) is formed to with enlarged portions (19a) and (19b) at the extended end so as to allow easy extension and retraction of the slit (19) during deformation of the block body (11).

EFFECTS OF THE INVENTION

According to the present invention, refractory cement which is used in the prior art is not employed around the extended sections (6a) and (6b) of the thermocouple element and around the joint sections (7a) and (7b) of the compensating conduction means (8a) and (8b). Therefore, a conventional forced drying step to remove water is not required. As a result, the manufacturing process becomes easy and inexpensive.

According to the present invention, the heat resistant protective tube (2) having the thermocouple (3) therein and the compensating conduction means (8a) and (8b) are held by the support means (9), and the end of the protective tube (2) and the connecting sections (7a) and (7b) of the compensating conduction means (8a) and (8b) project into the holding chambers (14a) and (14b). In this pre-assembled state, the filler (20) is introduced into the holding chamber to harden. Therefore, the positioning of each component is easy. By applying a simple operation to insert the filler (20) into the holding chamber and harden the filler, the protective tube (2) and the compensating conduction means (8a) and (8b) are suitably fixed in relative positions, and the extension sections (6a) and (6b) of the thermocouple element and the connecting sections (7a) and (7b) of the compensating conduction means are covered by and buried in the hardened filler (20).

Particularly, according to the present invention, the block body (11) which forms the support means (9) is formed of a material which is substantially non-hygroscopic and non-hydrous, and the filler (20) which fills the holding chambers (14a) and (14b) uses a setting resin which is substantially non-hygroscopic and non-hydrous. Accordingly, the present invention provides a temperature Sensor element having excellent electric insulation property.

The support means (9) is formed by a material such as rubber or flexible plastics having deformability and a recoverable property. Therefore, when the end of the protective tube (2) is inserted into the support hole (12) of the support means (9) to be held in place, the smooth insertion and holding of the end is ensured even when the protective tube (2) has dispersion or aberration in shape and dimensions within a tolerance dictated by the manufacturing process.

The support means (9) which holds the protective tube (2) and the compensating conduction means (8a) and (8b) has deformable and recoverable flexibility. The total body of the temperature sensor element is able to secure sufficient rigidity through the burying and integrating of the end (5) of the protective tube (2), the extended sections (6a) and (6b) of the thermocouple element which extends from the protective tube (2), and the joint sections (7a) and (7b) of the compensating conduction means (8a) and (8b) which connect the extension sections into the filler (20). The buried and integrated portions form a rigid body, therefore the total temperature sensor element ensures sufficient rigidity owing to the hardened filler (20).

The holding chambers (14a) and (14b) are formed in concave shapes each having a bottom face through the depression of a side of the block body (11). Therefore, the filler (20) is poured from the opening on the concave section, then the filler is hardened. The configuration makes the filling operation of the filler (20) easy.

The holding means (9) consisting of the block body (11) comprises the first holding chamber (14a) and the second holding chamber (14b) which receive the pair of extension sections (6a) and (6b) of the thermocouple element, and the holding chambers (14a) and (14b) receive the extension sections (6a) and (6b) of the thermocouple element and the connecting sections (7a) and (7b) of the first compensating conduction means (8a) and the second compensating conduction means (8b), the filler (20) being introduced therein to harden. This configuration allows the extended sections (6a) and (6b) of the thermocouple element and the connecting sections (7a) and (7b) to be received in the first and second holding chambers (14a) and (14b) respectively. As a result, these received components are fixed in the filler (20) in a state separated from each other, and there is no possibility of contact and short-circuiting of the pair of extension sections (6a) and (6b) of the element.

In particular, according to the present invention, when the temperature-measuring means, (4), which contains the thermocouple (3) in the heat resistant protective tube (2) having a pair of leg sections (10a) and (10b), is assembled, the slit (19) is formed starting from an end of the block body (11) and extending between the first holding chamber (14a) and the second holding chamber (14b). Therefore, the insertion of a pair of leg sections (10a) and (10b) of the U-shaped protective tube (2) into the pair of support holes on the block body becomes easy because the block body (11) is elastically deformed owing to the slit (19) even when the U-shaped protective tube (2) has dispersion or aberration in the gap between the leg sections (10a) and (10b) within a tolerance dictated by the manufacturing process or when there is torsion between the pair of leg sections (10a) and (10b).

What is claimed is:

1. A temperature sensor element in a temperature-measuring device comprising:

temperature-measuring means including a heat-resistant protective tube (2, 2a) having at least one end (5, 5a, 5b) and a thermocouple (3) inserted therein;

compensating conduction means (8a, 8b) having connecting sections (7a, 7b) which connect to a pair of extension sections (6a, 6b) of said thermocouple each of which extend from the protective tube (2, 2a); and support means (9) to join and hold both said temperature-measuring means and said compensating conduction means; wherein, said support means (9) is formed with a block body (11) having at least one wall defining support hole means (12, 12a, 12b) at an end of the block body through which said at least one end of said protective tube (2, 2a) is inserted and held therein, insertion hole means (13a, 13b) at the other end thereof through which said compensating conduction means (8a, 8b) are inserted, and holding chamber means (14a, 14b) formed therein which communicates the support hole means and the insertion hole means with each other, said holding chamber means (14a, 14b) being enlarged between the support hole means and the insertion hole means and formed in a concave shape with a bottom face formed by depressing a side of the block body (11) so as to form an opening thereon and having stopper means (18, 34) in the holding chamber means in the vicinity of the support hole means (12, 12a, 12b), and said at least one end (5, 5a, 5b) of the protective tube which is inserted into the support hole means (12, 12a, 12b) projects into the holding chamber means at first end and abuts said stopper means (18, 34), said connecting sections (7a, 7b) of the compensating conduction means which are respectively inserted into the insertion hole means (13a, 13b) project into said holding chamber means at a second end thereof, and a filler (20) is introduced into and hardened in said holding chamber means (14a, 14b) under a condition that the at least one end (5, 5a, 5b) of the protection tube (2, 2a) is fully supported by the at least one wall defining said support hole means (12, 12a, 12b) relative to said holding chamber means (14a, 14b) and the extension sections (6a, 6b) of the thermocouple are respectively connected with the connection sections (7a, 7b) within the holding chamber means (14a, 14b) to bury and fix said at least one end (5, 5a, 5b) of the protective tube, the extension sections (6a, 6b) of the thermocouple, and the connection sections (7a, 7b) of the compensating conduction means in said filler.

2. A temperature sensor element in a temperature-measuring device according to claim 1, wherein a temperature-measuring cartridge (21) is comprised by the temperature sensor element (1), a housing (28) enclosing said temperature sensor element (1), and a connector socket (24) provided at one end of said housing (28), said support means (9) of the temperature sensor element (1) is provided with a plug section (23) which is inserted into said connector socket (24), said compensating conduction means (8a, 8b) of the temperature sensor element (1) comprises support pins which are disposed along said connector socket (24) to form connector terminals of an electric connector, and said housing (28) is filled with refractory cement (29) whereby the support means (9) is buried therein.

3. A temperature sensor element in a temperature-measuring device according to claim 2, wherein said block body (11) which forms the support means (9) is formed by a deformable and recoverable material.

4. A temperature sensor element in a temperature-measuring device according to claim 3, wherein said deformable and recoverable material is selected from the group consisting of rubber and flexible plastics.

5. A temperature sensor element in a temperature-measuring device according to claim 2, wherein said holding chamber means comprises a first holding chamber (14a) and a second holding chamber (14b) in which the extension sections (6a, 6b) of the thermocouple are respectively inserted, said insertion hole means comprises a first insertion hole (13a) and a second insertion hole (13b) which are respectively opened facing the first and second holding chambers (14a, 14b), and said compensating conduction means comprises a first compensating conduction means (8a) and a second compensating conduction means (8b) which are respectively inserted through said first and second insertion holes (13a, 13b).

6. A temperature sensor element in a temperature-measuring device according to claim 1, wherein said block body (11) which forms the support means (9) is formed by a deformable and recoverable material such as rubber or flexible plastics.

7. A temperature sensor element in a temperature-measuring device according to claim 6, wherein a cylinder section is formed to define the support hole means (12, 12a, 12b) through which the end (5, 5a, 5b) of the protective tube (2, 2a) is inserted, said cylinder section is provided with a groove (16, 16a, 16b) along the axial direction of the support hole means to divide the peripheral wall of the cylinder section.

8. A temperature sensor element in a temperature-measuring device according to claim 1, wherein said holding chamber means comprises a first holding chamber (14a) and a second holding chamber (14b) in which the extension sections (6a, 6b) of the thermocouple are respectively inserted, said insertion hole means comprises a first insertion hole (13a) and a second insertion hole (13b) which are respectively opened facing the first and second holding chambers (14a, 14b), and said compensating conduction means comprises a first compensating conduction means (8a) and a second compensating conduction means (8b) which are respectively inserted through said first and second insertion holes (13a, 13b).

9. A temperature sensor element in a temperature-measuring device according to claim 1, wherein said heat-resistant protective tube (2a) includes one end (5) from which said pair of extension sections (6a, 6b) of said thermocouple (3) extends; and said support hole means (12) comprises a single hole through which said end of the protective tube (2) is inserted and held therein.

10. A temperature sensor element in a temperature-measuring device according to claim 1, wherein the heat-resistant protective tube (2) is substantially U-shaped and includes two ends (5a, 5b); and said pair of extension sections (6a, 6b) of said thermocouple (3), each extending from a respective end of the protective tube (2); and said support hole means (12a, 12b) comprises a pair of holes through each of which a respective one of said ends of the protective tube (2) is inserted and held therein.

11. A temperature sensor element in a temperature-measuring device comprising:

temperature-measuring means including a heat-resistant protective tube (2) formed in substantially U-shaped with a pair of leg sections (10a, 10b) and having a thermocouple (3) inserted therethrough;

first compensating conduction means (8a) and second compensating conduction means (8b) having connecting sections (7a, 7b) connecting respectively to a pair of extension sections (6a, 6b) of a thermocouple element extending from the leg sections; and support means (9) which connects and supports the temperature-measuring means and the pair of compensating conduction means (8a, 8b); wherein, said support means (9) is formed with a block body (11) having a first support hole (12a) and a second support hole (12b) for respectively inserting and holding the pair of leg sections (10a, 10b) of the protective tube in one end thereof, a first insertion hole (13a) and a second insertion hole (13b) for respectively inserting the pair of compensating conduction means (8a, 8b) in another end thereof, and first holding chamber (14a) and second holding chamber (14b) formed therein to mutually communicate the first support hole and the first insertion hole, and to mutually connect the second support hole and the second insertion hole respectively, said first and second holding chambers (14a, 14b) being physically separate from each other and enlarged between said first and second support holes (12a, 12b) and said first and second insertion holes (13a, 13b) respectively, and each holding chamber (14a, 14b) being formed in a concave shape with a bottom face formed by depressing a side of the block body (11) so as to form an opening thereon, said block body (11) being formed by a deformable and recoverable material such as rubber or flexible plastics, and being provided with a slit (19) starting from one end of the block body (11) and extending between the first holding chamber and the second holding chamber, the first leg section (10a) of the protective tube inserted into the first support hole (12a) projects into the first holding chamber (14a), and the connecting section (7a) of the first compensating conduction means (8a) inserted into the first holding chamber (14a) under a condition that the first extension section (6a) of the thermocouple element is connected with the connecting section (7a) within the first holding chamber (14a) to bury and fix the leg section (10a) of the protective tube, the first extension section (6a) of the thermocouple element, and the connection section (7a) of the first compensating conduction means in the filler (20), and the second leg section (10b) of the protective tube inserted into the second support hole (12b) projects into the second holding chamber (14b), and the connecting section (7b) of the second compensating conduction means (8b) inserted into the second insertion hole (13b) projects into the second holding chamber (14b), and the filler (20) is introduced into and hardened in the second holding chamber (14b) under a condition that the second extension section (6b) of the thermocouple element is connected with the connection section (7b) within the second holding chamber (14b) to bury and fix the leg section (10b) of the protective tube, the second extension section (6b) of the thermocouple element, and the connection section (7b) of the second compensating conduction means in the filler (20).

* * * * *